US006292434B1

(12) United States Patent
Ahn et al.

(10) Patent No.: US 6,292,434 B1
(45) Date of Patent: Sep. 18, 2001

(54) METHOD FOR FORMING A SPHERICAL WAVE BY SUPERPOSITION OF A PLURALITY OF LIMITED PLANE WAVES

(75) Inventors: Young-Bok Ahn; Jin-Sick Oh, both of Seoul; Tai-Kyong Song, Puchun, all of (KR)

(73) Assignee: Medison Co., Ltd., Hongchun-Kun (KR)

( * ) Notice: Subject to any disclaimer, the term of this patent is extended or adjusted under 35 U.S.C. 154(b) by 0 days.

(21) Appl. No.: 09/391,143

(22) Filed: Sep. 7, 1999

(30) Foreign Application Priority Data

Sep. 7, 1998 (KR) ........................................ 98-36792

(51) Int. Cl.[7] ........................................ G01S 7/524

(52) U.S. Cl. ........................................ 367/138; 367/154

(58) Field of Search ........................................ 367/138, 154; 73/642

(56) References Cited

U.S. PATENT DOCUMENTS 4,169,662 * 10/1979 Kaule et al. ........................ 367/138
4,591,241 5/1986 Huignard .
4,948,253 8/1990 Biegen .

FOREIGN PATENT DOCUMENTS 55129776 7/1980 (JP) .

* cited by examiner

*Primary Examiner*—Daniel T. Pihulic
(74) *Attorney, Agent, or Firm*—F. Chau & Associates, LLP

(57) ABSTRACT

A spherical wave formation method by superposition of a plurality of limited plane waves is provided, in which a plurality of sufficiently small elements in a linear transducer transmits a spherical wave according to a predetermined delay pattern to thereby form a plurality of limited plane waves, and then the plurality of the limited plane waves are superposed, to thereby form a large-sized spherical wave.

15 Claims, 2 Drawing Sheets

METHOD FOR FORMING A SPHERICAL WAVE BY SUPERPOSITION OF A PLURALITY OF LIMITED PLANE WAVES

BACKGROUND OF THE INVENTION

1. Field of the Invention

The present invention relates to a method for forming a large-sized spherical wave in which a plurality of limited plane waves are formed by waves transmitted from a respective one of a plurality of elements in a linear transducer based on a predetermined delay pattern and the plurality of the formed limited plane waves are superposed.

2. Description of the Related Art

A linear transducer is comprised of a plurality of elements, which transmit waves to a certain object and receive waves reflected from the object. In the case that height of each element is much larger than its width, the shape of the wave transmitted from each element is not nearly varied in the direction of its height. Thus, the travelling direction of the wave transmitted from the element is considered on the two-dimensional plane. In addition, the shape of the transmitted wave is varied according to the width of the element, in which case if the width of the element is very small the transmitted wave has a shape close to a spherical wave.

There are a dynamic focusing and a synthetic focusing in the focusing types for transmitting/receiving waves. In the case of the dynamic focusing, a transmit focusing is performed by applying a delay time to a respective one of elements and then transmitting a respective wave, and a receive focusing is performed by receiving the reflected wave and compensating for the applied delay time. Meanwhile, in the case of the synthetic focusing, a respective individual clement transmits and receives a wave, to thereby perform a focusing on a memory in a linear transducer.

However, since the wave transmitted from each clement is small in size in the case of the synthetic focusing, it does not travel up to a remote distance, by which reason a ratio of signal to noise is not good.

SUMMARY OF THE INVENTION

To solve the above problems, it is an object of the present invention to provide a method for forming a large-sized spherical wave by using spherical waves transmitted from a plurality of elements based on a predetermined delay pattern.

To accomplish the object according to the present invention, there is provided a method for forming a large-sized spherical wave by using waves transmitted from a linear transducer, the spherical wave forming method comprising the steps of: (a) transmitting waves having a respective time delay from a plurality of elements in the linear transducer, based on a predetermined delay pattern; (b) forming a plurality of limited plane waves by using the plurality of waves having the respective time delay transmitted in step (a); and (c) superposing the plurality of limited plane waves formed in step (b) in order to form the large-sized spherical wave.

BRIEF DESCRIPTION OF THE DRAWINGS

The object and other advantages of the present invention will become more apparent by describing in detail the structures and operations of the present invention with reference to the accompanying drawing, in which.

DETAILED DESCRIPTION OF THE PREFERRED EMBODIMENTS

A preferred embodiment of the present invention will be described with reference to the accompanying drawings.

The present invention considers a spherical wave on a two-dimensional plane in the case that height of a respective element in a linear transducer is much larger than its width.

Figure 1:
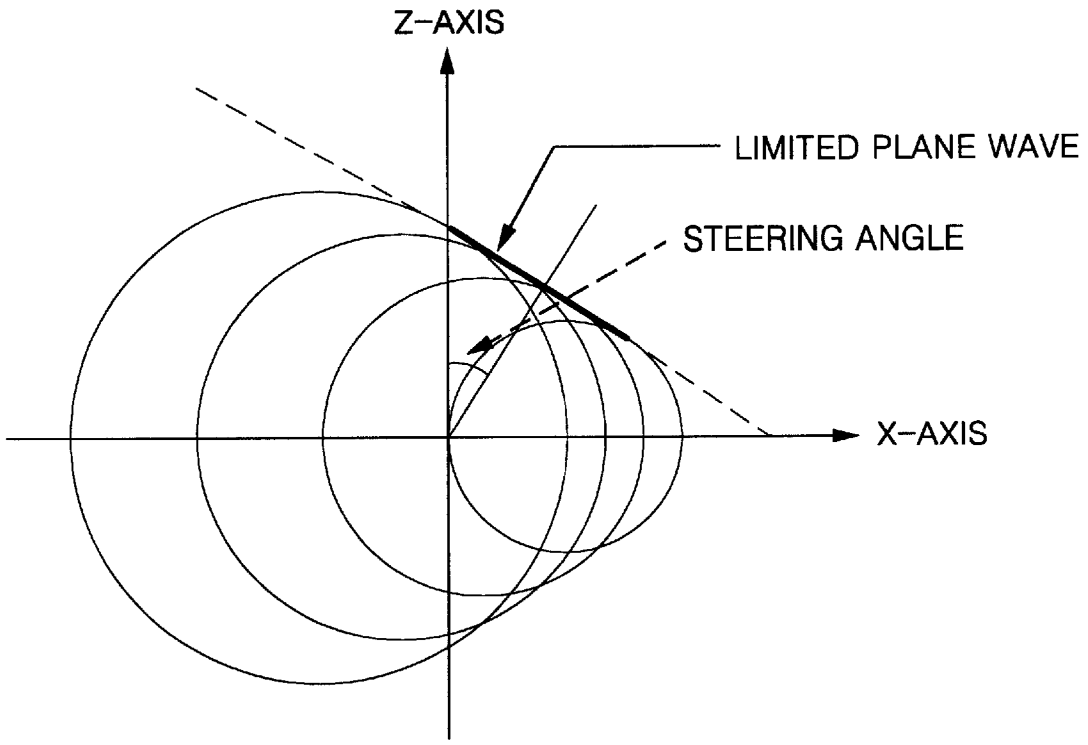
FIG. 1 (PRIOR ART)
FIG. 1 is a graphical view for explaining formation of limited plane waves.

FIG. 1 is a graphical view for explaining formation of limited plane waves. In FIG. 1, the x-axis represents a direction where respective elements in a linear transducer are arrayed. Also, a respective circle denotes a spherical wave transmitted from each element. Here, a shape of the pulse with respect to the spherical wave follows a Gaussian distribution, and the spherical wave P(t) is expressed as the following equation (1).

$$P(t)=\exp(-(\omega_0 t/\sigma)^2)\cdot\exp(-j\omega_0 t) \quad (1)$$

Here, $\omega_0$ denotes a center frequency, $\sigma(=2.5\pi)$ denotes the width of a pulse, and t denotes time.

Also, the directivity $A(\theta)$ of each element is expressed as the following equation (2).

$$A(\theta) = A_0 \frac{\sin\left(\frac{kw}{2}\sin\theta\right)}{\frac{kw}{2}\sin\theta}\cos\theta \quad (2)$$

Here, $A_0$ represents the initial state when $\theta$ is equal to 0, k is a wave number, w is the width of an element, and $\theta$ is an angle where a spherical wave travels in each element. A fall-off which means that a spherical wave is spread and weakened while it travels, is inversely proportional to a square root of a distance "r" at which the spherical wave from the linear transducer travels to a certain object and back. Also, the fall-off is expressed as the following equation (3).

$$\text{Fall}_{off} = \frac{1}{\sqrt{r}} \quad (3)$$

After the spherical wave has been transmitted from each element in the linear transducer, a plane wave is formed with respect to the same phase of the transmitted spherical wave. The plane wave has a limited length. Here, the plane wave having a limited length is called a limited plane wave, which is shown in FIG. 1.

The limited plane wave is expressed as the following equation (4) according to the Fresnel approximation equation in the polar coordinate system.

$$L^{\varphi}_{fresnel}(r,\theta) = L^{\varphi}_{fraun}(\theta) * \cos\left(\frac{-r}{2k\cos^2\theta}u^2\right) \quad (4)$$

Here, $L^{\Phi}_{fraun}(\theta)$ represents the Fraunhofer approximation equation in the polar coordinate system, k is equal to $2\pi/\lambda$, u is equal to $\sin\theta/\lambda$, $\phi$ is a steering angle of the limited plane wave. The limited plane wave in the equation (4) is expressed in the convolutional form between the wave in the Fraunhofer area and the cosine term.

Also, when a plurality of limited plane waves which have been formed as described above are superposed in a close distance, the superposed wave is expressed as the following equation (5).

$$\sum_{n=-\infty}^{\infty} L_{fresnel}^{\varphi_n}(r,\theta) = \sum_{n=-\infty}^{\infty}\left[L_{fraun}^{\varphi_n}(\theta) * \cos\left(\frac{-r}{2k\cos^2\theta}u^2\right)\right] = \left[\sum_{n=-\infty}^{\infty} L_{fraun}^{\varphi_n}(\theta)\right] * \cos\left(\frac{-r}{2k\cos^2\theta}u^2\right) = \frac{w}{\lambda}\cos\theta\cdot \mathrm{sinc}(wu) * \cos\left(\frac{-r}{2k\cos^2\theta}u^2\right) \quad (5)$$

(Here, $|u| \le 1/\lambda$)

In equation (5), r represents a distance between the center of the linear transducer and a certain point. Since the $(w/\lambda)\cos\theta\cdot\sin c(wu)$ term (which is called a first term hereinafter) is in accordance with a shape of a low-pass filter (LPF), the first term can be regarded as a LPF.

In addition, in the case of the $\cos(-ru^2/2k\cos^2\theta)$ term (which is called a second term hereinafter) in equation (5), the frequency range is varied according to a value of r in the limited range of u. That is, if the value of r becomes large, the range of u having a high frequency component becomes wide and the range of u having a low frequency component becomes small. Reversely, if the value of r becomes small, the range of u having high frequency component becomes small and the range of u having a low frequency component becomes large.

Thus, when the value of r becomes large, the portion representing a low frequency component in the second term is close to a pulse shape and the equation (5) becomes close to the first term. In this case, the first term in the equation (5) corresponds to the case where a plurality of limited plane waves have been superposed at a remote distance. That is, when a plurality of limited plane waves have been superposed at a remote distance, the superposed wave is expressed as the following equation (6) based on the Fraunhofer equation in the polar coordinate system and is the same as the first term in the equation (5).

$$\sum_{n=-\infty}^{\infty} L_{fraun}^{\varphi_n}(\theta) = \frac{w\cos\theta}{\lambda}\mathrm{sinc}(wu) \quad (6)$$

Figure 2:
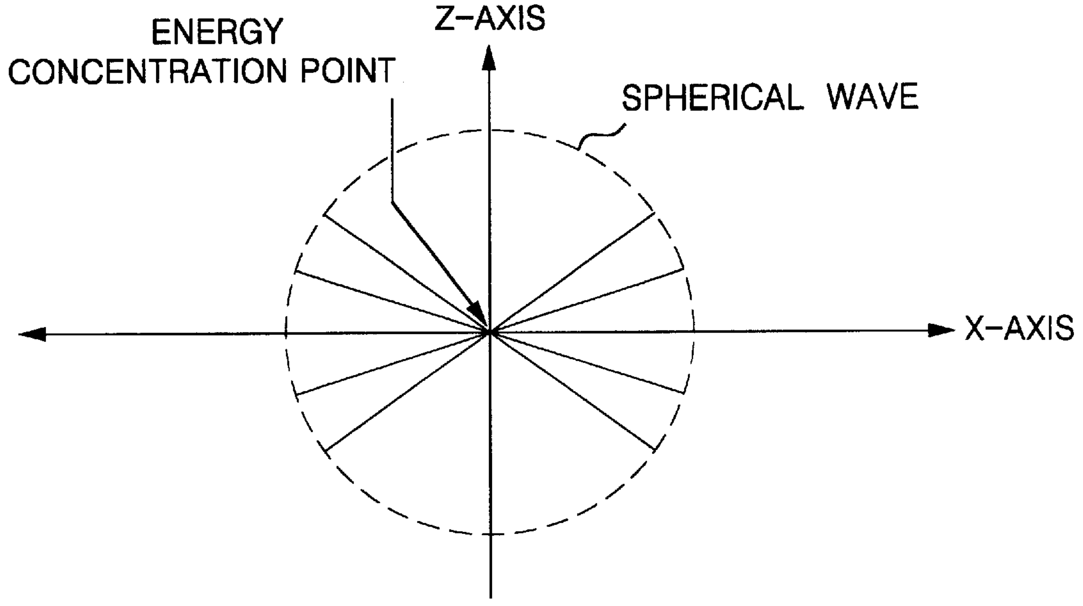
FIG. 2 is a graphical view for explaining formation a spherical wave by superposition of a plurality of limited plane waves.

The first term in the equation (5) and the expression of the equation (6) have a respectively same spherical wave as in the case where a spherical wave is transmitted from a single element as shown in FIG. 2, when the value of r becomes large.

Meanwhile, when the value of r becomes small in the equation (5), the portion representing a low frequency component of the second term becomes wide and the equation (5) becomes closer to the second term.

FIG. 2 is a graphical view showing a concept for forming a spherical wave by superposition of a plurality of limited plane waves which have been formed as described above. As depicted, if a plurality of limited plane waves having a variety of steering angle with respect to the spherical wave transmitted from each element are superposed, a single spherical wave is formed as if a spherical wave had been transmitted from a single element.

However, it can be seen from FIG. 2 that the center of the spherical wave by superposing the limited plane waves has been concentrated on a certain element on the x-axis. That is, such a phenomenon means that energy is conclusively concentrated on only a single element, and if the relative distribution of energy is considered, it is regarded that the spherical wave is transmitted to only a single element. Thus, in order to prevent the above energy concentration phenomenon, it is assumed that the center of the spherical wave by the superposition of the plurality of the limited plane waves does not exist on the x-axis where the respective elements are arranged, but exists behind the x-axis. That is, a virtual array, e. g. a virtual linear transducer which is located behind the actual linear transducer is introduced. Such an array is shown in FIG. 3.

Figure 3:
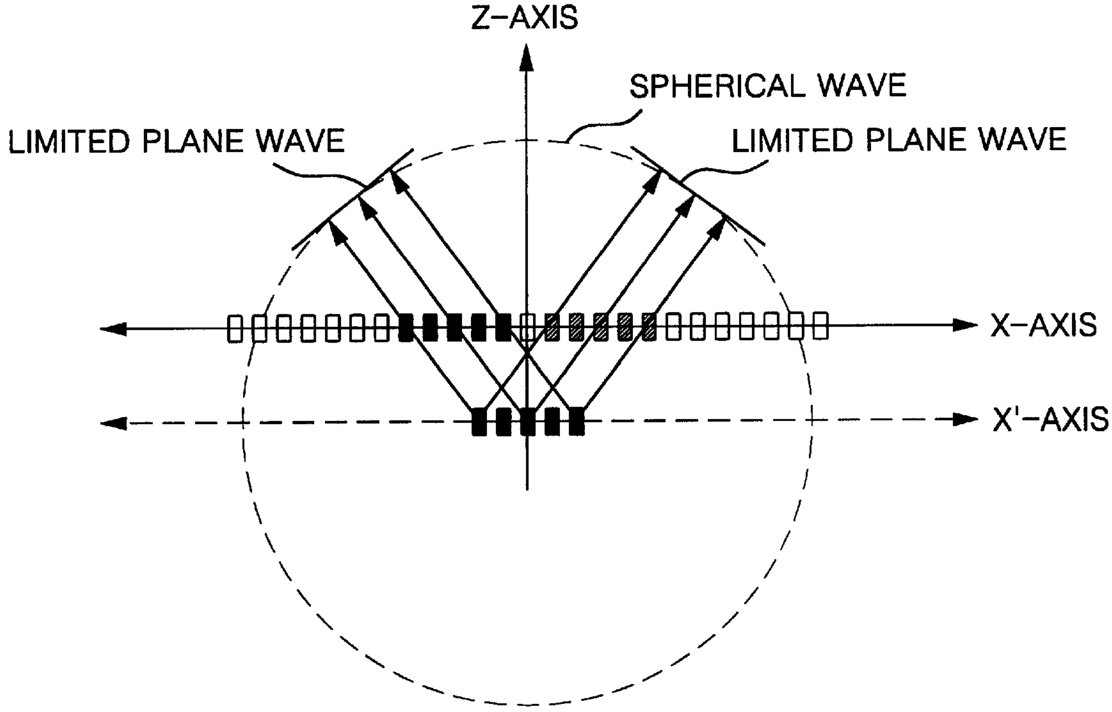
FIG. 3 is a graphical view showing position of a virtual linear transducer.

FIG. 3 is a graphical view showing positions of a virtual linear transducer. In FIG. 3, the virtual linear transducer on the x'-axis does not actually exist. Accordingly, each element located on the x'-axis transmits a spherical wave having a respective time delay based on a delay pattern, to thereby form a plurality of limited plane waves. Then, the plurality of limited plane waves are superposed, to thereby form a single spherical wave. This is equivalent to the case that the plane wave equivalent to the limited plane wave by the virtual linear transducer is formed by the actual linear transducer existing on the x-axis and the plurality of the limited plane waves which have been formed as described above are superposed, to thereby form a spherical wave. That is, in the case of the actual linear transducer, if each element transmits the spherical wave having a respective time delay based on a predetermined delay pattern, a plurality of limited plane waves are formed and then the plurality of the limited plane waves are superposed, resulting in formation of a single spherical wave.

As a result, the center of the spherical wave by the superposition of the plurality of limited plane waves exists on the virtual linear transducer located on the x'-axis, and the respective elements on the actual linear transducer have a relatively uniform energy distribution.

As described above, the spherical wave formation method according to the present invention forms a large-sized single spherical wave, by using a variety of elements. Accordingly, the present invention can make the formed spherical wave travel to a remote distance and improve a ratio of signal to noise.

Also, the spherical wave formation method according to the present invention can be embodied by repetitively transmitting a wave to each element with a time difference, when a currently available linear transducer is linear time invariant (LTI).

What is claimed is:

1. A method for forming a spherical wave by using waves transmitted from a linear transducer, the spherical wave forming method comprising the steps of:

(a) transmitting waves having a respective time delay from a plurality of elements in the linear transducer, based on a predetermined delay pattern;

(b) forming a plurality of limited plane waves by using the plurality of waves having the respective time delay transmitted in step (a); and (c) superposing the plurality of limited plane waves formed in step (b) in order to form the spherical wave.

2. The spherical wave formation method according to claim 1, wherein said delay pattern plays a role of preventing an energy center of the spherical wave from being concentrated on a single element among the plurality of elements.

3. The spherical wave formation method according to claim 1, wherein said plurality of the limited plane waves are a respective plane wave having a restricted length with respect to a same phase of the spherical waves transmitted from the plurality of elements.

4. The spherical wave formation method according to claim 1, wherein the wave obtained by superposing the plurality of limited plane waves at a remote distance, is expressed as the following equation based on a Fraunhofer equation on a polar coordinate system, $$\sum_{n=-\infty}^{\infty} L_{fraun}^{\varphi_n}(\theta) = \frac{w\cos\theta}{\lambda}\operatorname{sinc}(wu)$$

in which $L^{\Phi}_{fraun}(\theta)$ is a Fraunhofer approximation equation on the polar coordinate system, u is equal to $$\frac{\sin\theta}{\lambda},$$

w is a width of each element, and $\phi$ is a steering angle of each limited plane wave.

5. The spherical wave formation method according to claim 1, wherein the wave obtained by superposing the plurality of limited plane waves at a close distance is expressed as the following equation, in which case if the value of r becomes large, a waveform approximating to $(w\cos\theta/\lambda)\operatorname{sinc}(wu)$ is obtained to thereby form a spherical wave as if a single element transmits a spherical wave, $$\sum_{n=-\infty}^{\infty} L_{fresnel}^{\varphi_n}(r, \theta) = \frac{w\cos\theta}{\lambda}\operatorname{sinc}(wu) * \cos\left(\frac{-r}{2k\cos^2\theta}u^2\right)$$

in which r is a distance from the center of the linear transducer to a certain point, $k(=2\pi/\lambda)$ is the wave number, u is equal to $\sin\theta/\lambda$, w is the width of the element, and $\phi$ is a steering angle of the limited plane wave.

6. The spherical wave formation method according to claim 1, wherein a height of each of said elements is much larger than a width of each of said elements.

7. The spherical wave formation method according to claim 1, wherein said spherical wave can be formed by repetitively transmitting a wave to each element with a time difference when the linear transducer is linear time invariant.

8. A method of forming a spherical wave comprising the steps of:

transmitting a plurality of waves from a plurality of elements in a linear transducer based on a predetermined delay pattern;

forming a plurality of plane waves from said transmitted waves; and superposing the plane waves.

9. The method of claim 8, wherein each plane wave is formed with respect to a same phase of each transmitted wave.

10. The method of claim 8, wherein each plane wave has a limited length.

11. The method of claim 8, wherein the predetermined delay pattern prevents an energy center of the spherical wave from being concentrated on a single element.

12. The method of claim 8, wherein the spherical wave obtained by superposing the plurality of plane waves at a remote distance is expressed by the following equation based on a Fraunhofer equation on a polar coordinate system:

$$\sum_{n=-\infty}^{\infty} L_{fraun}^{\varphi_n}(\theta) = \frac{w\cos\theta}{\lambda}\operatorname{sinc}(wu)$$

in which $L^{\Phi}_{fraun}(\theta)$ is a Fraunhofer approximation equation on the polar coordinate system, u is equal to $$\frac{\sin\theta}{\lambda},$$

w is a width of each element, and $\phi$ is a steering angle of each plane wave.

13. The method of claim 8, wherein the spherical wave obtained by superposing the plurality of plane waves at a close distance is expressed as the following equation, wherein if the value of r becomes large, a waveform approximating to $$\frac{w\cos\theta}{\lambda}$$

sinc(wu) is obtained to thereby form a spherical wave as if a single element transmits a spherical wave:

$$\sum_{n=-\infty}^{\infty} L_{fresnel}^{\varphi_n}(r, \theta) = \frac{w\cos\theta}{\lambda}\operatorname{sinc}(wu) * \cos\left(\frac{-r}{2k\cos^2\theta}u^2\right)$$

in which r is a distance from the center of the linear transducer to a certain point, $$k = \frac{2\pi}{\lambda}$$

is the wave number, u is equal to $$\frac{\sin\theta}{\lambda},$$

w is a width of the element, and $\phi$ is a steering angle of the plane wave.

14. The method of claim 8, wherein a height of each element is greater than a width of each element.

15. The method of claim 8, wherein the spherical wave can be formed by repetitively transmitting a wave to each element with a time difference when the linear transducer is linear time invariant.

* * * * *